Jan. 3, 1950  G. B. RHEINFRANK, JR  2,493,032
GRIDDED CORE MATERIAL AND METHOD
Filed July 26, 1945  3 Sheets-Sheet 1
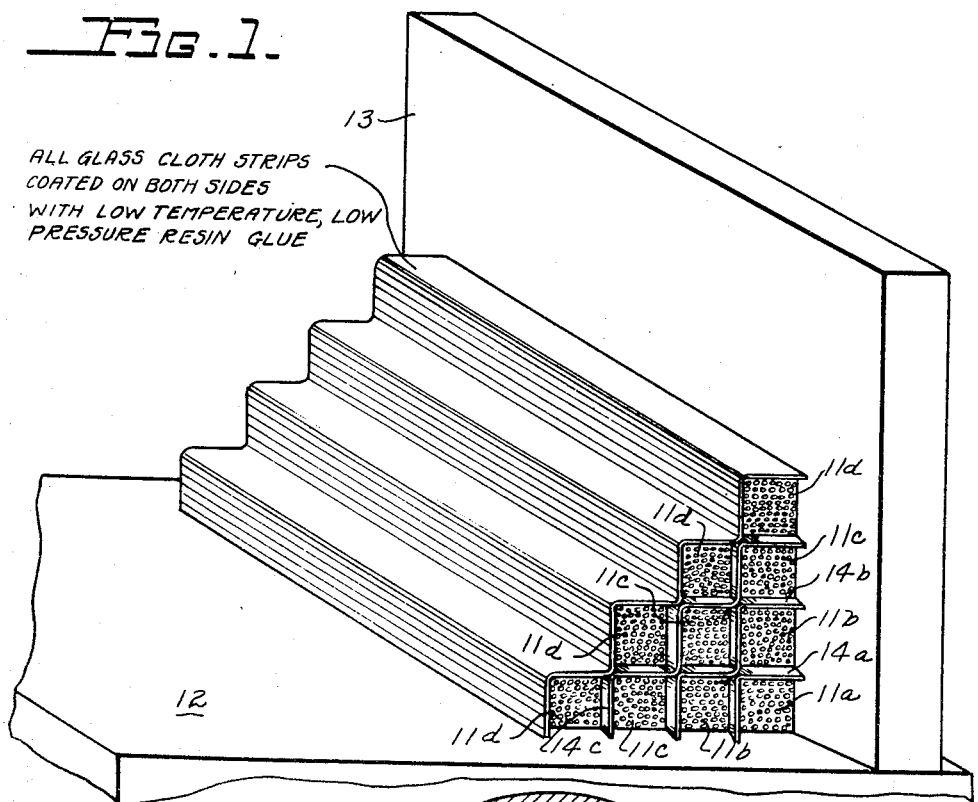
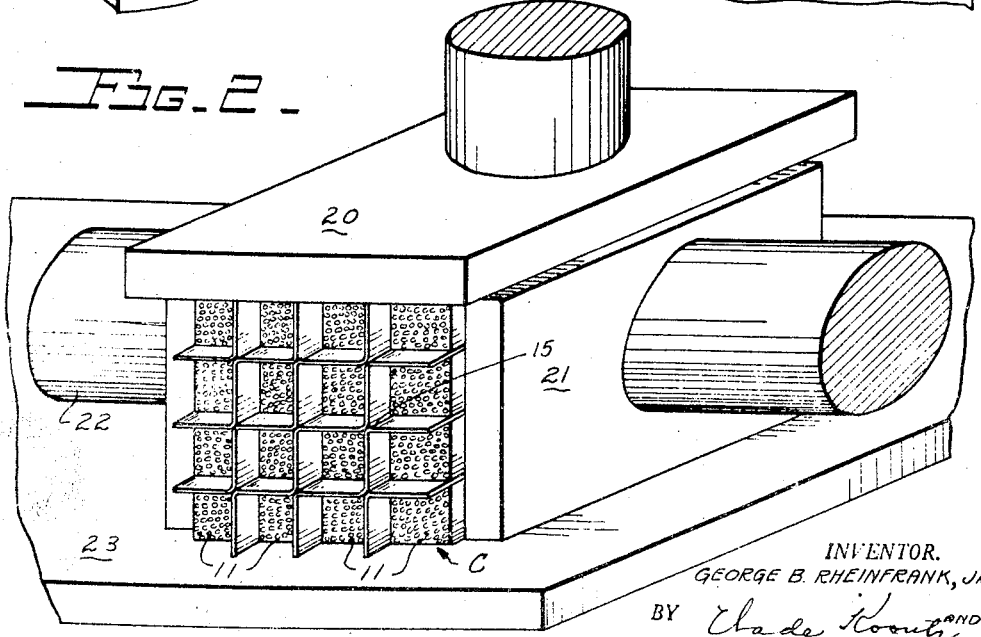
INVENTOR.
GEORGE B. RHEINFRANK, JR.
ATTORNEYS Jan. 3, 1950  G. B. RHEINFRANK, JR  2,493,032
GRIDDED CORE MATERIAL AND METHOD
Filed July 26, 1945  3 Sheets-Sheet 2

INVENTOR.
GEORGE B. RHEINFRANK, JR.
BY
ATTORNEYS

Jan. 3, 1950     G. B. RHEINFRANK, JR     2,493,032
GRIDDED CORE MATERIAL AND METHOD
Filed July 26, 1945     3 Sheets-Sheet 3
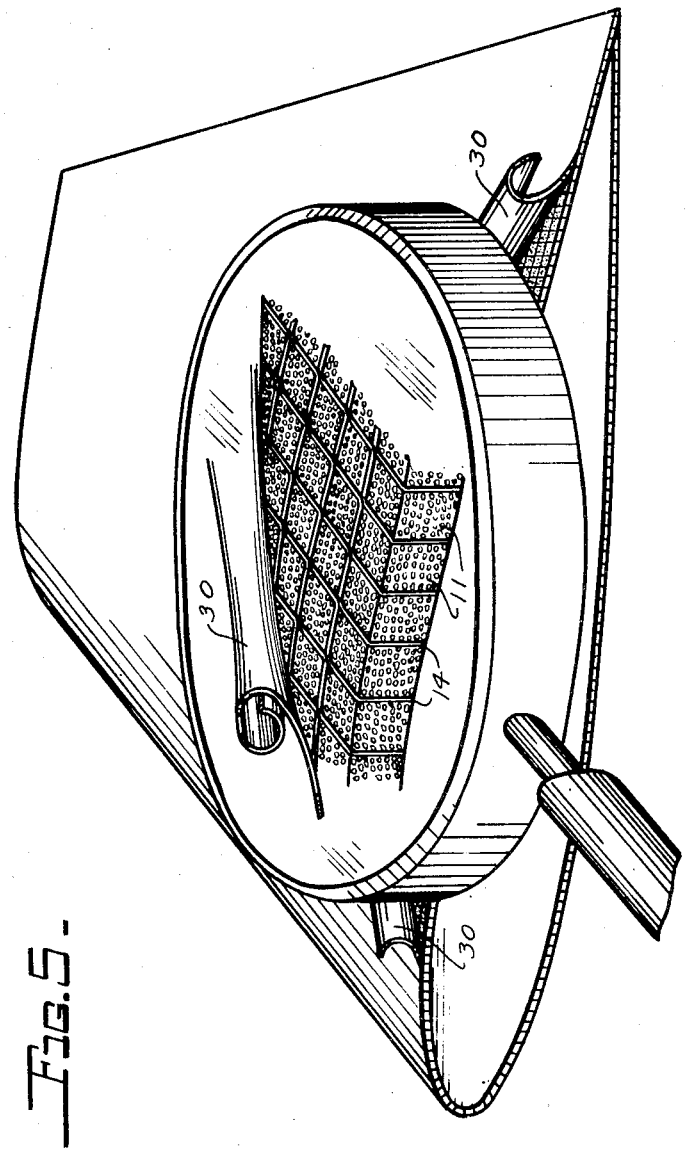
INVENTOR.
GEORGE B. RHEINFRANK, JR.
BY
ATTORNEYS Patented Jan. 3, 1950

2,493,032

UNITED STATES PATENT OFFICE 2,493,032

GRIDDED CORE MATERIAL AND METHOD

George B. Rheinfrank, Jr., Perrysburg, Ohio

Application July 26, 1945, Serial No. 607,244

3 Claims. (Cl. 154—125)

(Granted under the act of March 3, 1883, as amended April 30, 1928; 370 O. G. 757)

The invention described herein may be manufactured and used by or for the Government for governmental purposes without payment to me of any royalty thereon.

This invention relates to gridded material and method of making the same, and is an improvement over the article and method disclosed in my pending application Serial No. 492,309 filed June 25, 1943, now Patent No. 2,414,125, January 14, 1947. In said pending application, I have disclosed a structural material wherein a core of balsa wood (or other low density material) is bonded to a high strength load-carrying facing made of glass cloth by means of a low pressure, low temperature synthetic resin. Some of the uses and advantages of such material and method are explained in a series of articles published in vol. 21 No. 9 of "Modern Plastics" for May 1944. In accordance with the present invention, a gridded material made of glass cloth and cellular cellulose acetate (or its equivalent), bonded by a low temperature resin, is used as a core or filling for a sandwich whose outer layers are composed of multi-ply glass cloth, to yield an exceedingly strong, light-weight structural material useful in the manufacture of aircraft parts and many other articles. Further objects and advantages of the invention will be understood by referring to the following description in connection with the accompanying drawings forming a part of this specification.

In said drawings,

Fig. 1 is a perspective view showing one step in the forming of the gridded core material;

Fig. 2 is another perspective view showing diagrammatically heat and pressure-applying members for curing the assembly;

Fig. 5 is a perspective view of a wing section made of a plurality of sandwich members, with a part magnified to reveal its construction.

Figure 3:
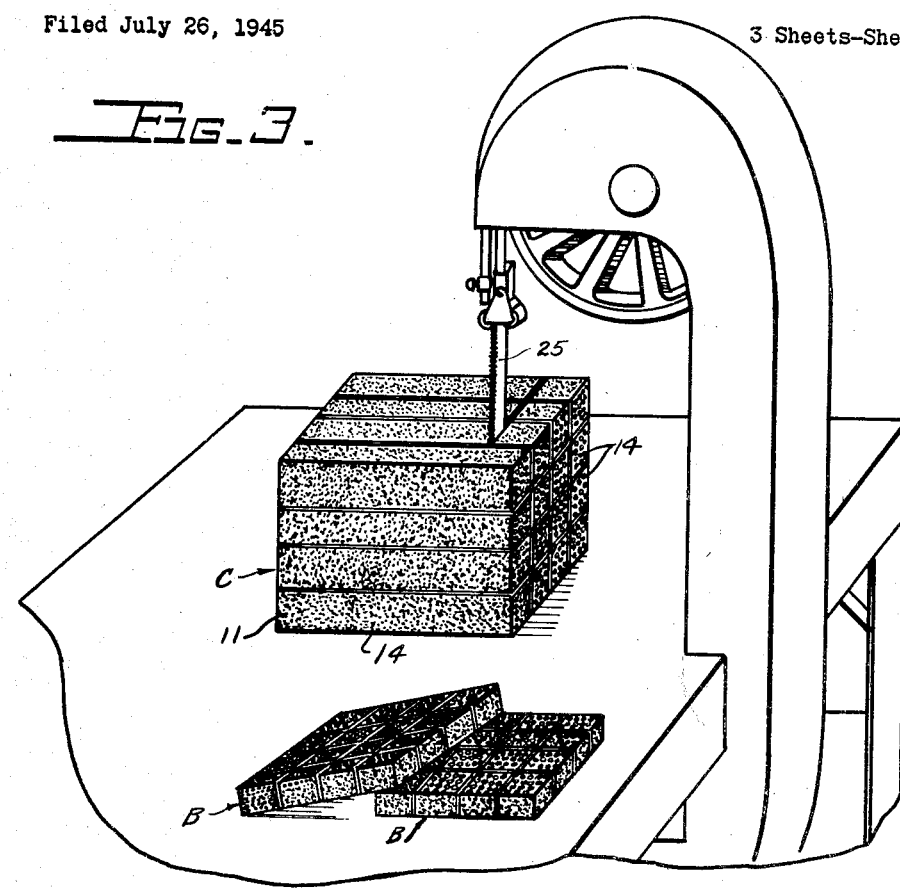
Fig. 3 is another perspective showing elements being sawn to form cores for a sandwich member.

Referring particularly to the drawings, the first step is the assembling of the component parts of the gridded core, viz., the glass fiber cloth, the cellular cellulose acetate and the resin glue or bonding agent. The preferred glass cloth is three ply and five ply, preferably unidirectional glass cloth, while the preferred resin is "Plaskon 900," a low pressure laminating resin made by Libbey-Owens-Ford Glass Company, Toledo, Ohio, and if desired flock fiber may be mixed with the resin to give added strength. Cellular cellulose acetate is made by foaming cellulose acetate and has an average density of 7 lbs./cu. ft. It may be cut or otherwise formed to provide a plurality of core elements 11 which are elongated parallelopipeds. These elements may be one-half inch square (0.25 sq. in.) in one form of the invention, or if the strength and density of the final product are to be less, they may be larger in cross section, and they will have any length desired. Strips 14 of glass cloth (three ply "Fiberglas," made by Owens-Corning Fiberglas Corporation, or equivalent material) are cut to size, and the first strip 14a is coated with the bonding agent on the underside and then is laid over the first element 11a which is placed on a table 12 and held against a guide 13. Then the outer surfaces of strip 14a are coated with resin glue and two identical elements 11b are placed on the top and to one side. Next a second glass cloth strip 14b is laid over the tops and sides of elements 11b and is then coated with the resin glue. Because strip 14b must cover more surface it is about twice as wide as strip 14a, but its edges likewise abut the guide 13 and table 12, as shown. On top of the elements 11b, three elements 11c are arranged, like steps, and a third glass cloth strip 14c is placed on the tops and sides thereof, preparatory to receiving four elements 11d. The process of building the gridded core continues step by step in the manner described until a core block of the desired dimensions and configuration (usually rectangular) is assembled.

From the above description and a study of Figs. 1 and 2 it will be clear that the cellulose acetate elements at the four corners of the core are each in contact with a glass cloth strip on two sides, while the outer (exposed) elements between the corners are each in contact with glass cloth strips on three sides, and all the elements on the interior of the core block are in contact with the glass cloth on all four sides. Furthermore each glass cloth strip extends entirely through the core from one face to another at right angles, and each is in contact with at least one other like strip all along the angles or bends 15.

The assembled core block is then placed in a press or clamp, which is diagrammatically shown in Fig. 2, consisting of three clamping plates 20, 21 and 22 and a base or bottom rest 23. The clamping plates may be controlled in any desired way to subject the four sides of the core to compression, which may be very low in the case of "Plaskon 900" or a similar resin, that is, around 15 p. s. i., but the compression is maintained substantially constant during the curing. The entire core while clamped as shown is heated in an oven (not shown) or it may be heated by induction (radio frequency heating). A temperature of 220° F. for one hour is sufficient to polymerize the resin and cause it to set to a hard consistency, which effectively bonds all the elements together and forms a very rigid core body.

Figure 4:
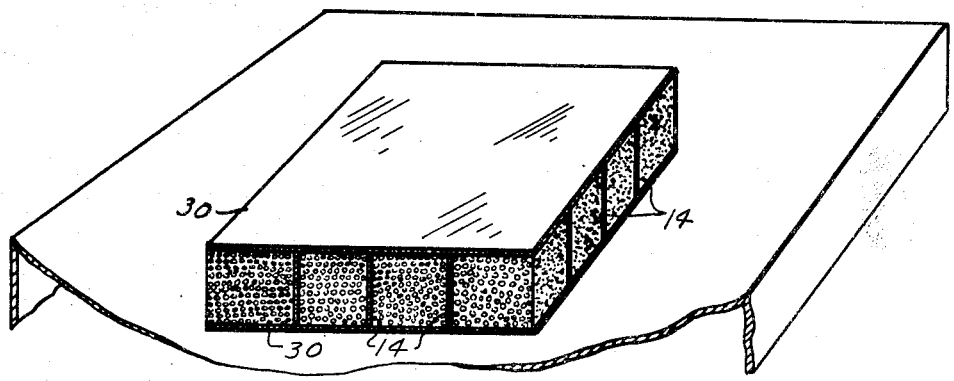
Fig. 4 is a perspective view of a sandwich member.

The core body C is now cut into pieces of uniform size by sawing, for instance, by the band saw 25 partially shown in Fig. 3. The band saw may be standard metal-cutting saw and the cuts are usually made at right angles to the lengths (longitudinal axes) of the glass cloth strips. The work will of course be guided during the sawing by a guide not shown, to insure straight cuts, although curved cuts could be made if it is desired to produce blocks of varying thickness, or curved or tapering sheets. Two blocks or sheets B are shown as cut from the core body C. Usually the blocks or sheets will be much larger than those shown in Fig. 3. The blocks B may be used in constructing some articles without further treatment, but preferably each block or sheet B is faced on its top and bottom faces with five or seven ply glass cloth layers 30 (Fig. 4) which are applied with a resin and bonded under heat and low pressure as described above. Layers 30 greatly enhance the tensile strength of the block and will considerably increase its compressive strength, its modulus of rupture, buckling strength and impact resistance. The sandwich type of construction shown in Fig. 4 will therefore be used when the greatest possible strength is desired.

A further advantage of the sandwich is its high resistance to fire, as the plies of glass cloth which cover nearly all the exposed surfaces of the block cannot burn. While cellular cellulose acetate burns quietly in the air when ignited, it is impossible for a sheet or block made as described above to burn as an entirety, since any flames which may start to burn an exposed portion of the cellulose acetate will quickly meet the barriers offered by the grid of bonded glass cloth, which surrounds each cube of cellulose acetate on all or nearly all sides, and normally will be snuffed out. Flames cannot travel along the outer surfaces of the sandwich because there is nothing adjacent said surfaces to feed the flames. A further advantage of the outer layers of the sandwich is the fact that the resin when cured is practically as smooth as glass, and forms a glossy film over the exposed surface of the glass cloth layers which has little skin friction, so that the sandwich is admirably adapted to serve as an airfoil such as a wing, and may form some of the outer walls of an empennage or fuselage. Another advantage is the strong bond which is obtainable between cellular cellulose acetate and the glass cloth of the grid and of the facing sheets, partly because the cells afford excellent anchoring points. These cells vary greatly in size and shape and are smaller, are closer together and are more irregular than the round cells shown in the drawings for convenience of illustration.

As will be understood from Fig. 5, an entire wing section or tail surface may be constructed by assembling a multiplicity of sandwich-like members and curing them under light pressure and low heat, as already explained. If preferred, assembling may be accomplished against a form (not shown) and curing may then take place. A number of the sandwich-like members properly assembled would make excellent luggage, because of the extreme lightness of the material (specific gravity 0.1 to 0.2) plus its high strength/weight ratio and impact resistance. The grid of resin-stiffened glass cloth is unyielding and provides a large number of columns for sustaining compressive and tension stresses and for resisting blows. The multiplicity of columns provided by the grid are bonded to the facing or outer layers of the sandwich and act to stabilize or prevent buckling of the facings when the sandwich is compressed longitudinally or laterally. Furthermore the cellular cellulose acetate completely fills the voids between the columns and thus supports the columns against buckling, while bonding all the columns together by the high adhesion between the glass cloth strips and the minute cells of the acetate. Actual tests show that sandwich members made from three and five ply glass cloth with a grid of one-half inch squares will support a compressive load of over 500 lbs. per linear inch.

While the preferred arrangement employs a grid of glass cloth strips, it is within the scope of my invention to form the cellulose acetate or other foamed plastic core material with non-rectangular cross section, for example, hexagonal cross sections, with the assembly accomplished in the manner explained above. The term "grid" is intended to cover rectangular, hexagonal, and polygonal arrangements of glass cloth strips.

What I claim as new and desire to secure by Letters Patent is:

1. A method of making lightweight structural members of high strength which comprises forming a plurality of long cellular cellulose acetate bars of substantially square cross section, forming a block of the bars by laying down one bar, laying a strip of glass cloth, coated with a synthetic resin to completely cover two adjacent sides of the bar, laying down a diagonal row consisting of two of the bars, each bar with one side covering the said strip and with the diagonals of their cross section in the same plane, said plane being parallel to the plane of the diagonal of the first said bar, completely covering the four outer sides of the two bars of the diagonal row with a single strip of the said resin coated glass cloth, laying subsequent diagonal rows of the bars and completely covering their outer sides with glass cloth strips coated with resin and in like manner, each diagonal row having one more bar than the diagonal row next preceding until a predetermined number is reached, then decreasing the number of bars in each succeeding diagonal row by one bar until a single bar is reached, subjecting the block to light heat and pressure to cure the resin, cutting slabs off the block transversely of the bars, facing the sides of the slabs transverse to the bars with resin coated glass cloth, and subjecting the covered slabs to heat and pressure to cure the resin.

2. A core material for a lightweight structural member of great strength which comprises a plurality of cellular cellulose acetate bars of substantially square cross section and strips of glass cloth between the sides of the bars bonded together with the bars by means of a synthetic resin, the bars and cloth being situated with respect to each other in the following order: first a single bar, then a single strip of the cloth extending over adjacent sides of said single bar, then two of the bars each lying with one side against the said strip, the diagonals of the cross section of the two said bars being thereby in the same plane, the said same plane being parallel to the plane of the diagonal of the first said bar, then a single strip of the cloth extending over the four outer sides of the two bars, subsequent diagonal rows of the bars being similarly situated and having their outer sides completely covered in like manner, each diagonal row having a number of bars which is one greater than the number of bars in the row next preceding up to a predetermined number, and thereafter subsequent diagonal rows having a number of bars which is one less than the row next preceding, the rows ending with a single bar.

3. The structure defined in claim 2 cut transversely into slabs and provided with facings of resin impregnated glass cloth bonded to the outer exposed faces of the slabs.

GEORGE B. RHEINFRANK, JR.

REFERENCES CITED

The following references are of record in the file of this patent:

UNITED STATES PATENTS

| Number | Name | Date |
|---|---|---|
| 2,090,084 | Walper | Aug. 17, 1937 |
| 2,376,653 | Boyer | May 22, 1945 |
| 2,377,846 | Dreyfus et al. | June 5, 1945 |
| 2,414,125 | Rheinfrank, Jr. | Jan. 14, 1947 |

FOREIGN PATENTS

| Number | Country | Date |
|---|---|---|
| 559,527 | Great Britain | Feb. 23, 1944 |